United States Patent
Chien et al.

(10) Patent No.: US 6,308,062 B1
(45) Date of Patent: Oct. 23, 2001

(54) WIRELESS TELEPHONY SYSTEM ENABLING ACCESS TO PC BASED FUNCTIONALITIES

(75) Inventors: Andrew Ying-Tsai Chien, Buena Park; James Wang, Mission Viajo, both of CA (US)

(73) Assignee: Ericsson Business Networks AB (SE)

( * ) Notice: Subject to any disclaimer, the term of this patent is extended or adjusted under 35 U.S.C. 154(b) by 0 days.

(21) Appl. No.: 08/812,855

(22) Filed: Mar. 6, 1997

(51) Int. Cl.[7] .................................................... H04Q 7/20
(52) U.S. Cl. ......................... 455/420; 455/556; 455/557; 455/563
(58) Field of Search ................................. 455/403, 550, 455/556, 557, 558, 559, 66, 575, 563, 461, 462, 412, 414–7, 418, 19, 20; 395/200.49; 379/225, 88.01, 88.04

(56) References Cited

U.S. PATENT DOCUMENTS

| | | | |
|---|---|---|---|
| 5,297,183 | * | 3/1994 | Bareis et al. .................... 455/563 X |
| 5,325,419 | | 6/1994 | Connolly et al. . |
| 5,333,178 | | 7/1994 | Norell . |
| 5,371,901 | | 12/1994 | Reed et al. . |
| 5,551,068 | * | 8/1996 | Goldsmith et al. .............. 455/575 X |
| 5,553,312 | * | 9/1996 | Gattey et al. .................... 455/66 X |
| 5,561,446 | * | 10/1996 | Montlick .......................... 455/66 X |
| 5,649,005 | * | 7/1997 | Lynch et al. ..................... 379/225 X |
| 5,793,762 | * | 8/1998 | Penners et al. ................... 455/461 X |
| 5,873,031 | * | 2/1999 | Griffith et al. ................... 455/412 |
| 5,878,343 | * | 3/1999 | Robert et al. .................... 455/462 X |

FOREIGN PATENT DOCUMENTS 0 730 364  2/1996 (EP) .

OTHER PUBLICATIONS

International Search Report, Jul. 17, 1998, ISA.

* cited by examiner

*Primary Examiner*—Fan S. Tsang
*Assistant Examiner*—Philip J. Sobutka

(57) ABSTRACT

A system enabling a user wireless access to a variety software functionalities residing within a personal computer is disclosed. The system includes a portable device, bus and fixed radio part enabling a user of the portable device access to a variety of software functionalities within a personal computer. The portable device generates control commands which are wirelessly transmitted to the fixed radio part. The fixed radio part processes the control commands and provides them to the personal computer via a bus capable of transmitting isochronous signals. An interface associated with the computer is responsive to the control commands and provides the portable device access to the variety of software functionalities in response thereto.

23 Claims, 6 Drawing Sheets

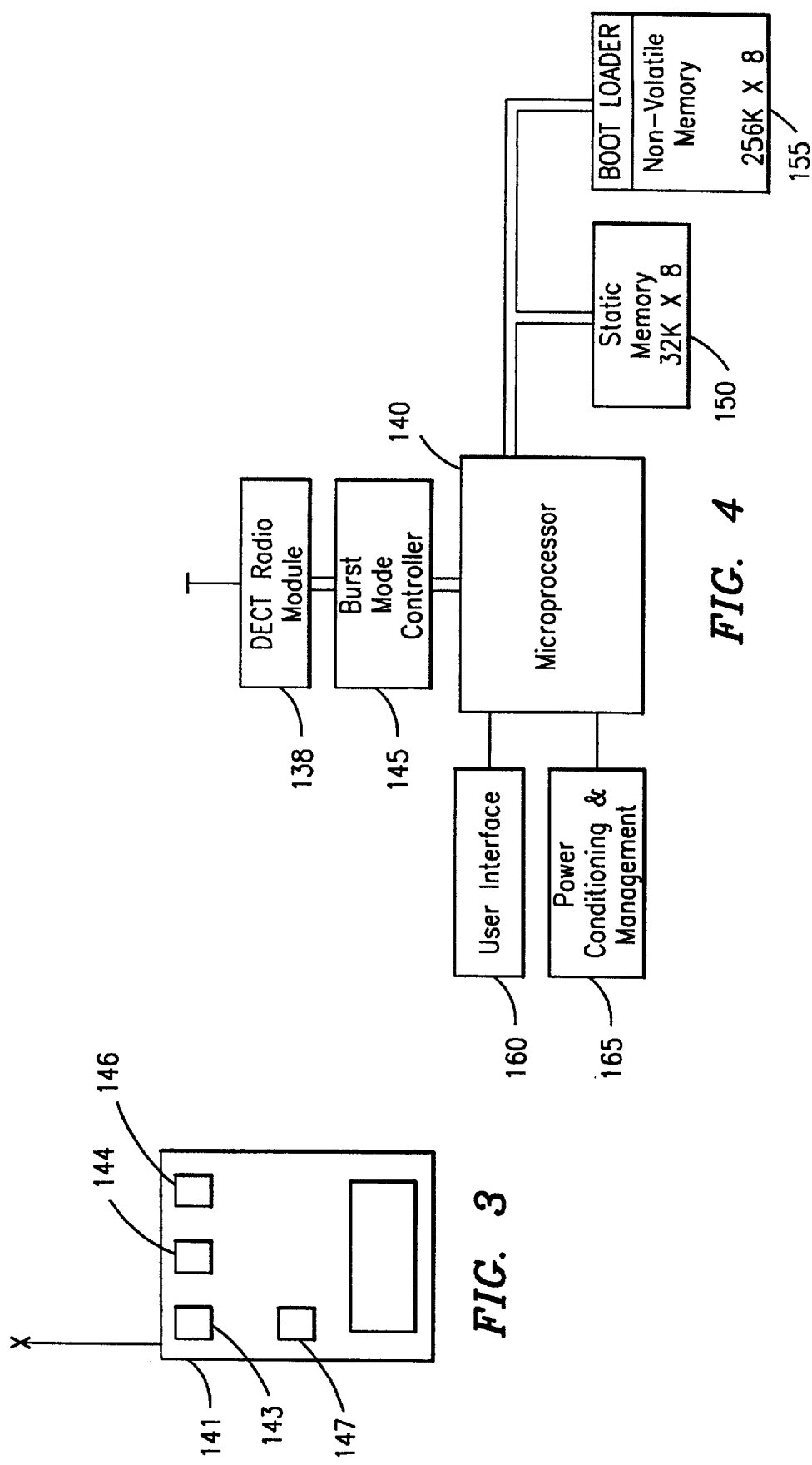

WIRELESS TELEPHONY SYSTEM ENABLING ACCESS TO PC BASED FUNCTIONALITIES

BACKGROUND OF THE INVENTION

1. Technical Field of the Invention

The present invention relates to wireless telephony systems, and more particularly, to a system enabling a link to be formed between portable wireless devices and a personal computer enabling the portable wireless devices to access software functionalities provided by the personal computer.

2. Description of Related Art

Home cordless telephones and hand-held cellular telephones provide users with basic telephony functions. On their own, cordless and hand-held cellular telephones provide users with the basic abilities to call out and receive calls and further provide a few additional functionalities such as hook switch and flash button that enable a home cordless or hand-held cellular telephone user to access in-phone features such as a dialing memory. Thus, these types of phones provide a user with basic but limited functionalities.

The telecommunications industry has developed a variety of applications and functionalities that expand the manner in which telephone calls may be processed. Services such as call logging, voice mail, e-mail, intelligent call routing, and others, have greatly increased the manner in which telephony services may be used. Unfortunately, presently existing systems providing these types of services are normally provided via dedicated hardware that implements all of the desired services within a single dedicated hardware unit. Systems of this type are usually very expensive, thus limiting their use to businesses having the necessary funds to purchase and maintain such systems. A personal user, or even a small business, does not have the resources necessary to implement these types of hardware intensive telephony services on their own. Thus, some manner of enabling personal or small business users to incorporate a wider variety of telephony services and features within their existing cordless or personal use phones/electronic devices at a reasonable cost would be of great benefit.

SUMMARY OF THE INVENTION

The present invention overcomes the foregoing and other problems with a system providing a user wireless access to a variety of software functionalities within a personal computer. The system consists of three main portions, namely a portable device enabling wireless access, a radio-fixed part for processing and transmitting/receiving the wireless signal to/from the portable device and a high speed serial bus for interconnecting the radio-fixed part with the personal computer and the software functionalities.

A user operating a portable device such as a cordless handset, dual-mode cordless handset, PDA or operate portable laptop computer generates control commands to operate various software functionalities residing within an attached computer. The control commands may consist of digitally encoded data, DTMF or voice commands. These control commands are transmitted to the fixed radio part of the system as a wireless signal. The fixed radio part processes the control command signals from the portable device and transmits these control commands to the attached personal computer via a high-speed serial bus. The high-speed serial bus may operate according to a variety of protocols as long as the bus is capable of supporting isochronous signals.

The fixed radio part may also be configured to receive/send control commands and data through a PSTN network via a PSTN interface. This interface would enable interaction with a PSTN line, ISDN line or access to the Internet.

Associated with the personal computer is an interface responsive to the control commands received from the portable device that enables access to the software functionalities provided by the personal computer. The interface is responsive to commands received from a remote user accessing the personal computer via a PSTN or ISDN line.

BRIEF DESCRIPTION OF THE DRAWINGS

For a more complete understanding of the present invention, reference is made to the following detailed description taken in conjunction with the accompanying drawings wherein:

FIG. 3 is an illustration of a cordless handset;

FIG. 4 is a block diagram of a portable device of the system;

DETAILED DESCRIPTION OF THE INVENTION

Figure 1:
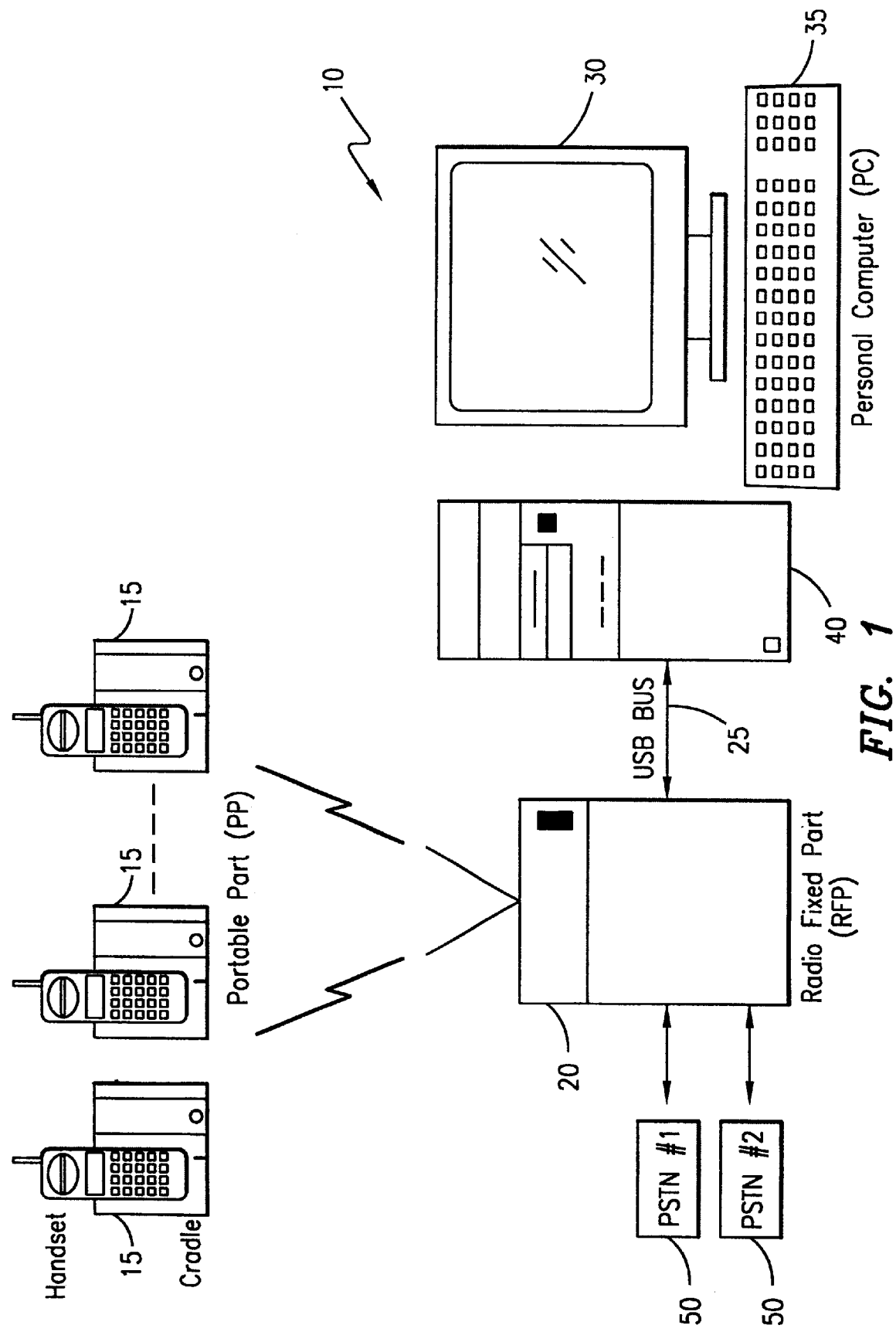
FIG. 1 illustrates the system of the present invention for providing increased telephony functions and features via a portable wireless device.

Referring now to the drawings, and more particularly to FIG. 1, there is illustrated the system of the present invention. The system is a wireless telephony system enabling the interconnection of a personal computer (PC) 10 to a plurality of portable devices 15. Interconnection between the personal computer 10 and portable devices 15 is accomplished via a radio-fixed part (RFP) 20 and universal serial bus (USB) 25. The PC 10 contains a set of controlling software enabling the implementation of a variety of features that are not normally offered by a cordless or hand-held telephone or similar device.

The personal computer 10 comprises a well known personal computing system, including a display 30, keyboard 35, and central processing unit 40. In a preferred embodiment, the personal computer 10 is operated according to an operating system, such as Windows 95 or Windows NT. The personal computer 10 provides open application programming interfaces (API) such as telephony API (TAPI) and message API (MAPI) to enable interaction between the portable devices 15 and the personal computer 10. The personal computer interfaces with the radio-fixed part 20 via a universal serial bus 25 or other type of high speed serial bus such as IEEE1394.

The universal serial bus 25 is an external input/output peripheral bus enabling various types of data to be transferred between the radio-fixed part 20 and personal computer 10. The universal serial bus 25 provides a single interface to the PC 10 for up to 127 different devices. These devices can comprise input/output devices, such as a keyboard, mouse, microphone and speakers, or telecommunication devices, such as interconnections to a public switch telephone network (PSTN), ISDN line or PBX telephone system.

The universal serial bus 25 provides for isochronous data transfer with a guaranteed bandwidth and low latencies for telephony and audio data at data transfer speeds of between 10 Kb/s to 10 Mb/s. The bus 25 includes plug and play capabilities such that devices may be dynamically attached/detached and the system reconfigured with the addition or removal of various peripheral devices. While the system has been described with respect to the use of a universal serial bus, any other bus standard enabling similar functionalities and isochronous data transfer would be applicable.

Figure 2:
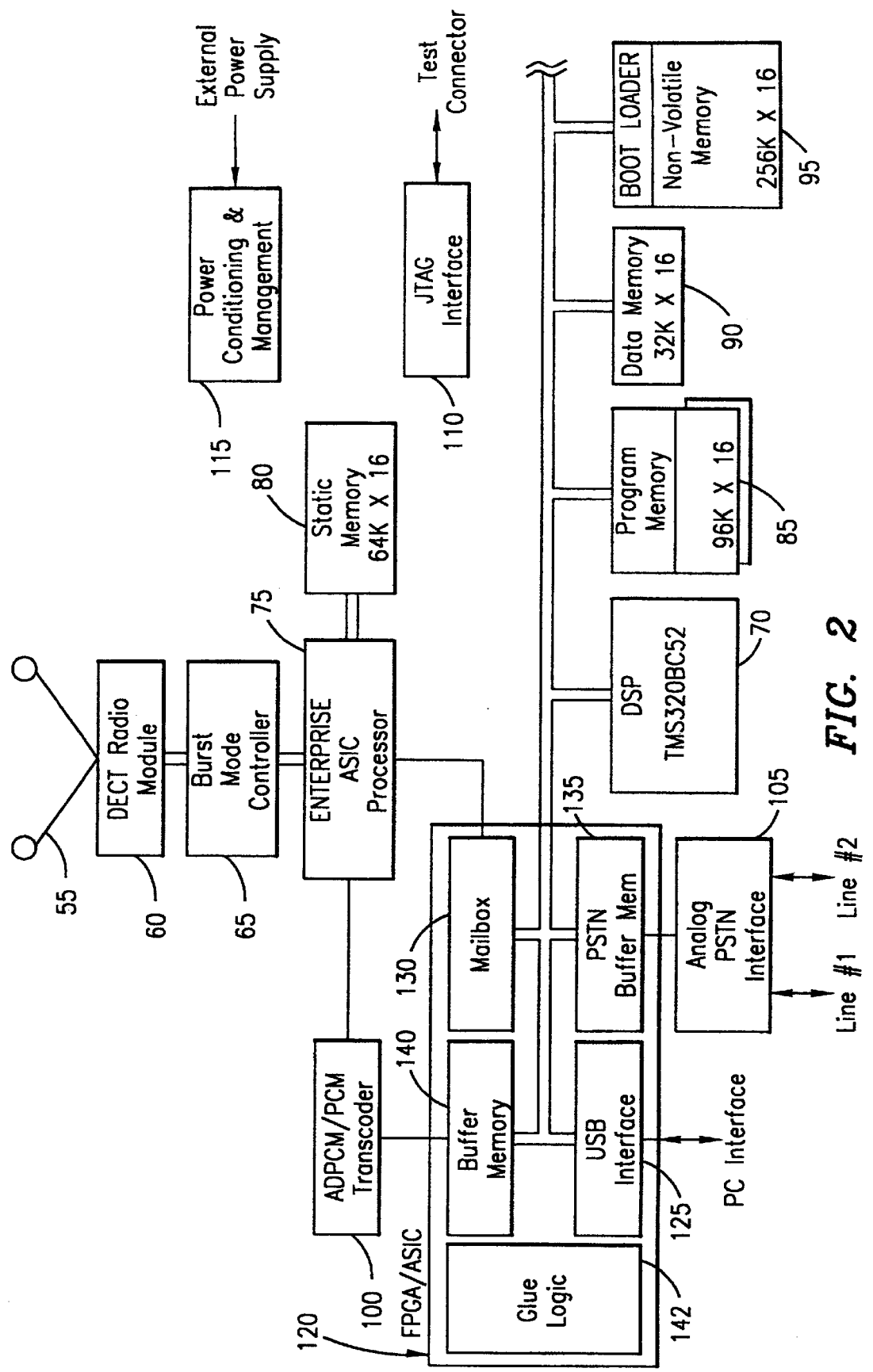
FIG. 2 is a block diagram of the radio-fixed part of the system.

A radio-fixed part 20 connects to the PC 10 through the universal serial bus 25 and provides the hardware and firmware necessary to interface the PC 10 and portable devices 15 with an analog pubic switched telephone network 50. The radio-fixed part 20 is designed to support multiple portable devices 15 through twelve simultaneous radio channels and four network interfaces which can be analog or digital. Referring now to FIG. 2, there is illustrated a block diagram of the radio-fixed part 20. Signals from the portable devices 15 are received via antenna 55. The received signals are initially processed via a Digital European Cordless Telephone (DECT) radio module 60. In one embodiment the DECT radio module 60 is implemented within a Rembrandt chip set. The DECT radio module 60 transmits and receives the audio and control data to and from the portable devices 15 using the DECT air interface standard.

A burst mode controller (BMC) 65 provides the interface between the DECT radio module 60 and digital signal processor (DSP) 70. The BMC 65 implements the DECT physical and partial MAC layer processing. The BMC 65 provides a 64-slot ADPCM highway, a DECT core for automatic burst building and burst decoding, a DECT encryption and decryption engine, DECT frame synchronization, a software programmable radio interface to interface with a wide range of radio architectures, and a host interface.

The enterprise processor 75 interfaces with the BMC 65 and controls the DECT radio module 60 as well as passing audio data and control signals to and from the digital signal processor (DSP) 70. The enterprise processor 75 is an ASIC processor supporting all layers of the DECT radio module 60 firmware. Associated with the enterprise processor 75 are 128 Kb of external SRAM 80, the contents of which are downloaded during system initialization.

The digital signal processor (DSP) 70 supports all speech related functions and interfaces to the PC 10 over the universal serial bus 25. Functions supported by the DSP 70 include PSTN data handling, DTMF DECT and dial out, echo cancellization, self-test, boot load during system initialization and the universal serial bus interface for the radio-fixed part 20. Associated with the digital signal processor 70 are 128 K words of program memory 85 and data memory 90, along with four megabits of flash memory 95 for permanent and reusable storage for the DSP and enterprise processor firmware.

The ADPCM/PCM transcoder 100 handles real-time translation of audio data between the PSTN (or PC 10) and the portable devices 15. The transcoder 100 provides full duplex, six channel simultaneous translation from/to 32 Kbps ADPCM data to/from 64 Kbps PCM data. In one embodiment an MC145532 transcoder manufactured by Motorola is utilized.

Analog PSTN interface 105 supports two PSTN connections. The PSTN interface 105 consist of dual PCM codec, speech network, ring detect, and other circuitry necessary to interface with an analog phone line. The hardware implementation is common for all supported countries, however, any regional dependencies, such as line impedance, are controlled by the firmware. The JTAG test interface 110 enables system self test as well as factory testing of the radio-fixed part 20.

The power conditioning and management circuitry 115 provides external power via an AC adapter with world class accepted input voltage range. The external power input is further regulated and filtered to enable the necessary power requirements for the DEC radio module 60 and the digital logic circuitry. The FDGA/ASIC 120 provides the universal serial bus interface, including universal serial bus interface engine 125, hardware implementation of the mail box 130 between the enterprise processor 75 and the DSP 70, the PSTN buffer memory 135, ADPCM/PCM transcoder buffer memory 140 and other logic 142 necessary to make all radio-fixed part components interoperable.

The portable device 15 comprises wireless devices designed to communicate with the radio-fixed part 20 or with other portable devices. A variety of portable devices 15 may be utilized by a user to access the software features of the personal computer 10 via the radio-fixed part 20. A cordless handset 141, as shown in FIG. 3, comprises the preferred type of access device. A cordless handset 141 would include at least four buttons, including on/off 143, hook 144, flash 146 and intelligent agent 147 (IA). The on/off button 143 is used to turn the handset power on and off. The hook button 144 is used to make external calls and receive external/internal calls. The flash button 140 is used to access services provided by the public network. Finally, the IA button 147 enables access to services provided by the personal computer 10 through an intelligent agent interface.

A dual-mode cordless handset would have similar button functionalities. A user may also access the radio-fixed part 20 via a personal digital assistant (PDA) or portable computer (such as a lap top) including a wireless communications interface for receiving and downloading various types of data. Finally, a wireless electrical sensor may communicate with the radio-fixed part 20 to enable control of various electronic devices and appliances within range of the radio-fixed part 20 via the personal computer 10 or a remote user accessing the personal computer through an outside PSTN line or another portable device 15.

Referring now to FIG. 4, there is illustrated a block diagram of the portable device 15 architecture necessary to provide a wireless interface with the radio-fixed part 20. The portable device 15 requires a DECT radio module 138 for transmitting and receiving radio signals to/from the radio-fixed part 20. A microprocessor 140 controls the DECT radio module 138 via a burst mode controller 145. The burst mode controller 145 implements the DECT physical and partial MAC layer processing. The microprocessor 140 includes associated static memory 150 for temporary storage purposes, and a non-volatile memory 155 for storing microprocessor firmware.

A user interface 160 includes the various flash, hook and intelligent interface buttons discussed previously enabling the user to interact with system functionalities. The user interface 160 would further enable the entry and receipt of various types of data. The power conditioning and management circuitry 165 controls charging of batteries (not shown) powering the portable device 15 whenever the portable device 20 is resting within a storage cradle. The power conditioning and management circuitry 165 further regulates and filters the battery output supplied to the DECT radio module 138 and the digital logic circuitry of the portable device 15.

Figure 5:
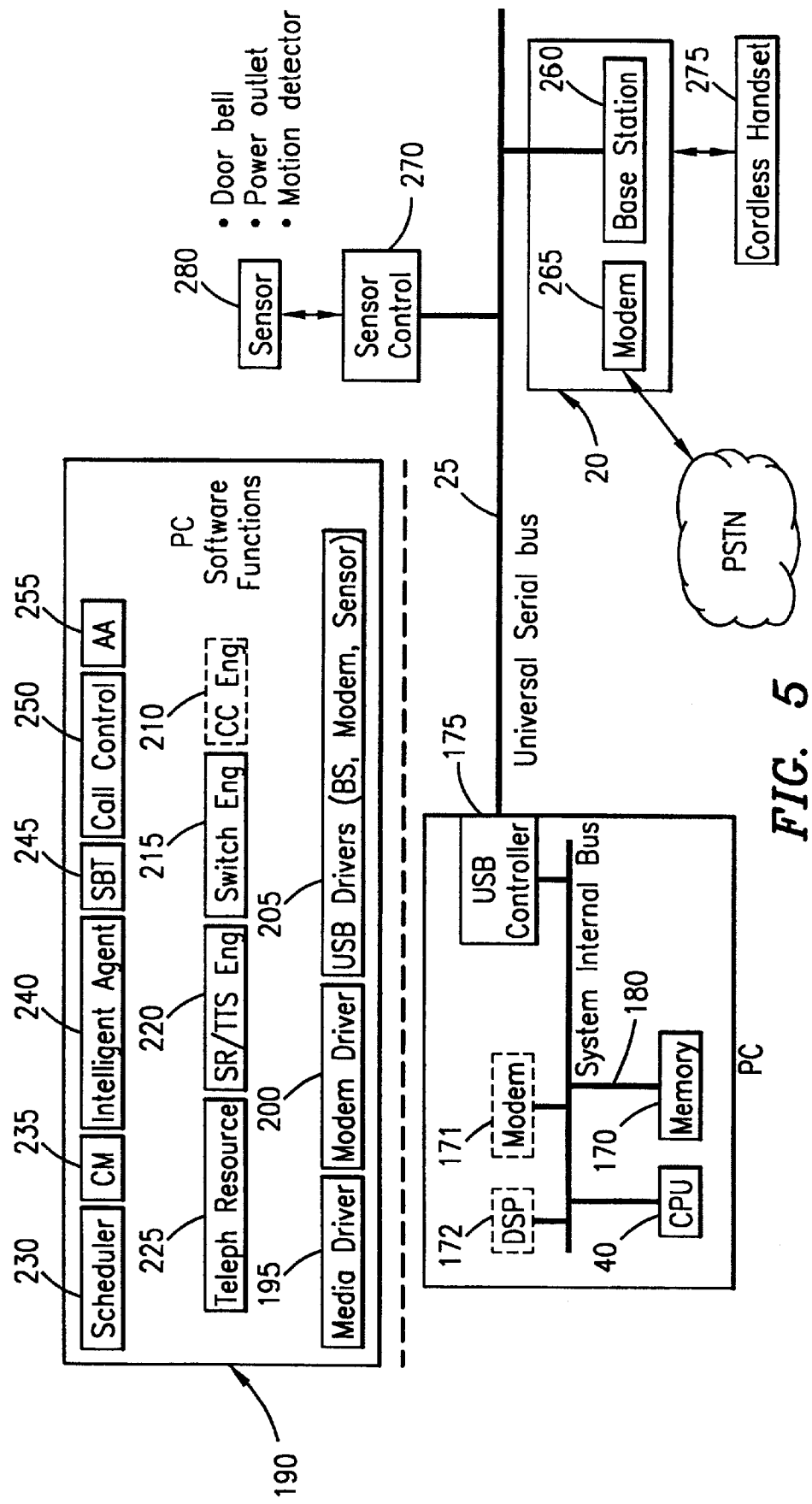
FIG. 5 is a functional block diagram of the system and the various associated software functionalities that may be provided.

Referring now to FIG. 5, there is illustrated a functional block diagram of the system more simply illustrating the interaction of the components and the software applications 190 of the PC 10. The PC 10 includes central processing unit (CPU) 40, a memory 170, and a universal serial bus controller 175. The CPU 40 and memory 170 communicate with the universal serial bus controller 175 via a system internal bus 180. The PC 10 may contain a modem 171 and DSP 172 to facilitate remote interconnection directly with the PC rather than through universal serial bus 25.

The CPU 40 and memory 170 enable the application of a variety of PC software functions 190. The PC software functions 190 include, but are not limited to, media drivers 195 for displays, speakers and the like; modem drivers 200 for driving PC and universal serial bus modems; universal serial bus drivers 205 for controlling the USB 15 interface between the various system components,; telephone resources 225 enabling a variety of telephony functionalities; the speech recognition/text to speech (SR/TTS) engine 220 provides speech recognition capabilities; the switch engine 215 for controlling telephony switching functions; the CC (call control) engine 210; a scheduler 230; CM (configuration management) 235; intelligent agent 240; SBT (screen-based telephony) 245; call control 250 and AA (automatic attendant) 255 for automated call answer processing.

Figure 6:
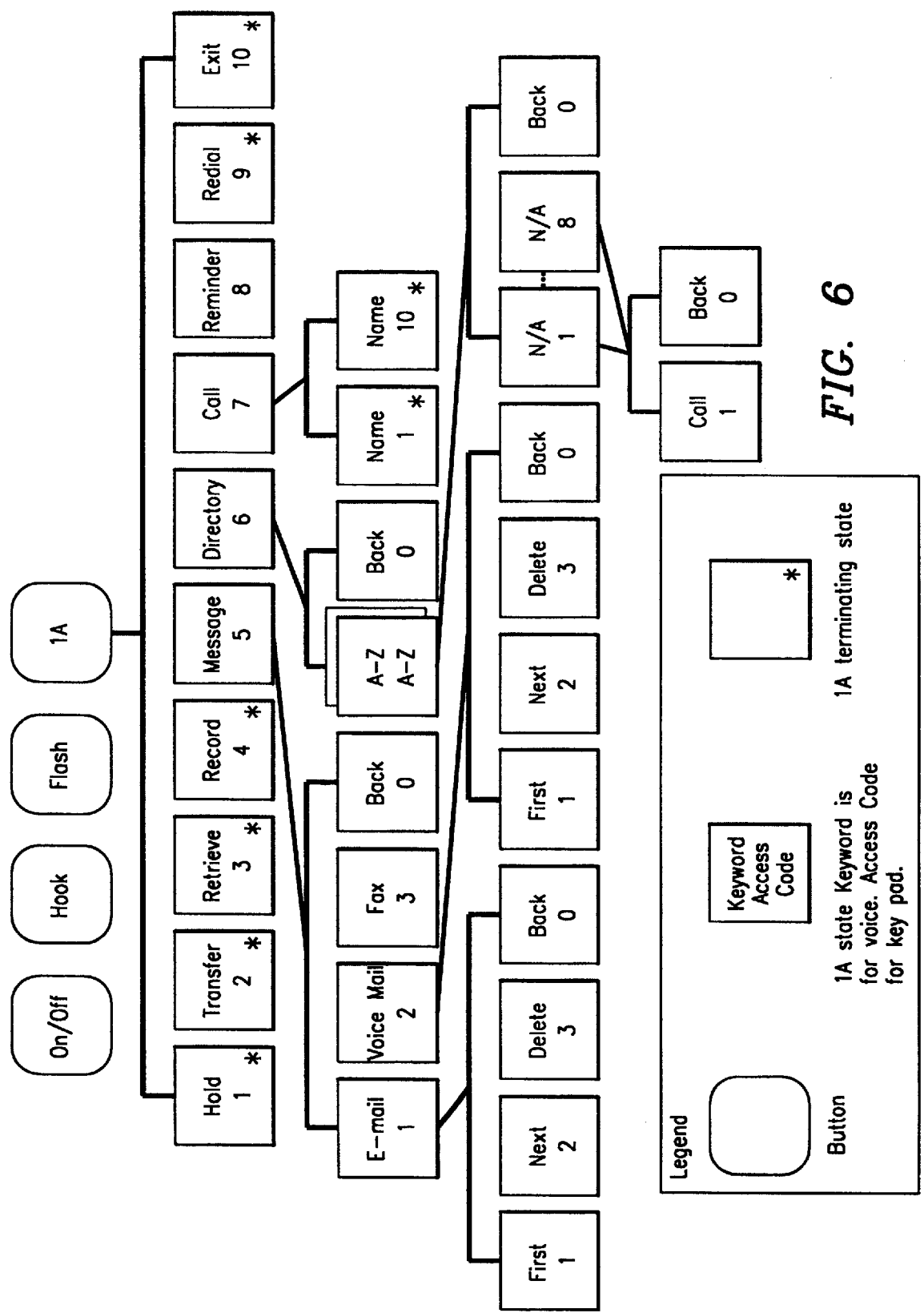
FIG. 6 is an illustration of one embodiment of the intelligent agent interface.

The intelligent agent 240 provides an interface enabling the portable devices 15 to access the PC software functionalities 190. The intelligent agent interface 240 responds to input from the portable device 15 and is actuated by the pressing of the intelligent interface button 147 of the portable device 15. Once the intelligent agent interface 140 is activated, a user may access a variety of software functionalities, such as e-mail, voice mail or fax by merely pressing a button to actuate DTMF signaling or providing keyword inputs to actuate a voice recognition engine 220. One potential embodiment of the intelligent agent interface is illustrated in FIG. 6.

The PC 10 is interconnected to the base station 260 and modem 265 portions of the radio-fixed part 20 via a universal serial bus 25. The base station portion 260 of the radio-fixed part 20 provides the radio communication link to a portable device 15, such as a cordless handset 275. A sensor controller 270 may also be interconnected to the universal serial bus 25 to enable the wireless control of a remote sensor 280 connected to some other type of electrical or electronic device. The sensor 280 may be used to actuate or deactuate devices such as the door bell, power outlet or motion sensor. In this way, a user may access the sensor controller 270 locally to activate the electrical or electronic device through the cordless handset 275, or remotely, by accessing the sensor controller through universal serial bus modem 265 or PC modem 171.

Figure 7:
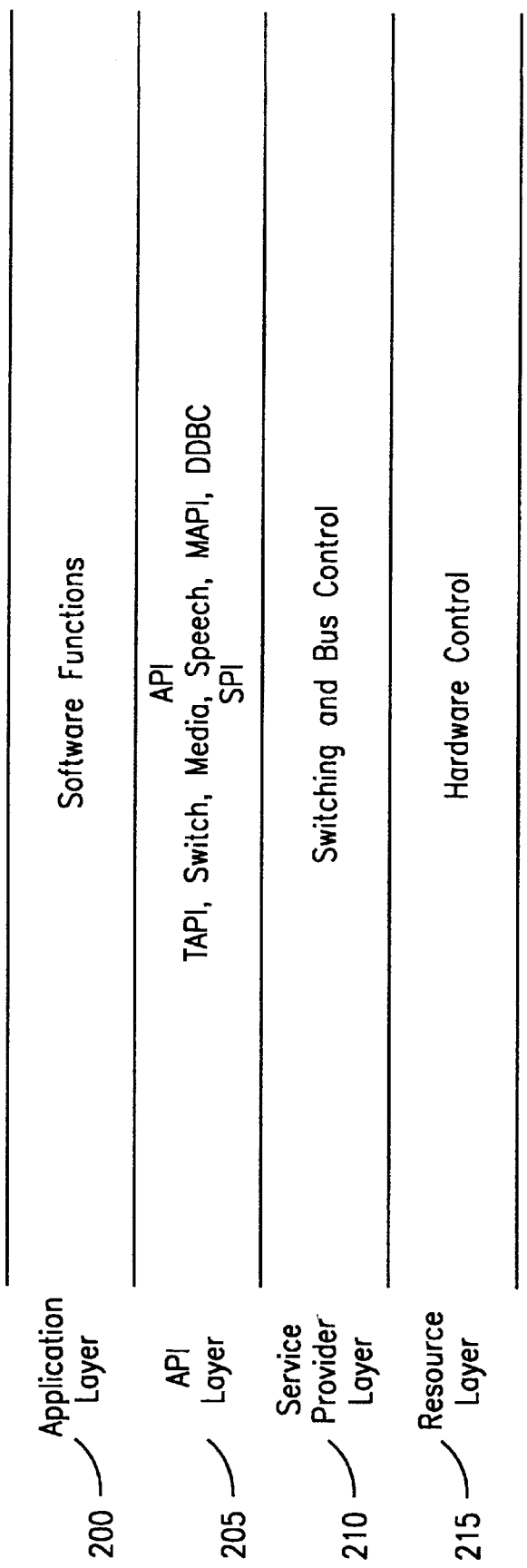
FIG. 7 is a functional block diagram of the software architecture enabling interaction between a portable device and the system applications.

Referring now to FIG. 7, there is illustrated a functional diagram of the software architecture of the system. The software architecture consists of four separate software layers enabling communication between various PC software functions 190 and a portable device 15. These layers include the application layer 200, application program interface (API) 205, service provider layer 210 and resource layer 215. The application layer 200 comprises the various PC software functions 190 included within the PC 10. The software functions 190 can include, but are not limited to, screen based telephony; the intelligent agent interface; switching functionalities, such as internal calls, external calls, and conference calls; call logging, voice mail, e-mail, etc. These functions are all responsive to input received from a portable device 15.

The portable device 15 and personal computer 10 controlling software comprise the resource layer 215 and control the physical operation of these hardware devices. The service provider layer 210 controls the transfer of data between the various hardware devices comprising the system, such as the PC 10, radio-fixed part 20 and portable devices 15. The data transmitted between the hardware devices is able to interact with the software functions of the application layer 200 via the API layer 205. The API layer 205 enables receipt and transmission data by the software functions 190.

The software functions 190 which may be provided by the PC include full telephony service functionalities, including the handling of incoming and outgoing telephone calls, call holding and transferring, voice activated name dialing, directory assisted name dialing, and last number redialing. Telephony services may also include the logging and recording of incoming calls or recording of memos via telephone functions. Messaging services may also be provided, including e-mail, voice mail, and fax. A reminder service functionality may provide a user with periodic reminders of important events, meetings and the like. An intelligent address book function may be used for the routing of incoming calls to particular individuals based upon a caller identification number or as a directory service for enabling connection through particular callers. Interworking service functions may provide interworking for modem, PSTN and Internet services. Thus, for example, a user could access the Internet through a portable device 15. The above list of service functionalities is merely intended to be illustrative of the various services which may be provided using this system and any service capable of being implemented via PC software is applicable to the invention as described.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A system enabling a user wireless access to a variety of telephony software functionalities residing within a personal computer, comprising:

a portable wireless device enabling selective use of the telephony software functionalities of the computer by the portable device in response to control commands generated by the portable device, the control commands transmitted from the portable device as a wireless signal;

a bus for transmitting control commands to the personal computer;

a sensor controller interfaced with the bus, said controller controlling a remote sensor associated with an electronic device;

a radio-fixed part for transmitting/receiving the wireless signal control command from the portable wireless device and processing the wireless signal for transmission over the bus to the personal computer; and an interface associated with the personal computer and responsive to the control command received over the bus for providing the portable device use of the variety of telephony software functionalities.

2. The system of claim 1 wherein the portable device comprises a wireless handset.

3. The system of claim 1 wherein the portable device comprises a personal digital assistant.

4. The system of claim 1 wherein the portable device comprises a dual mode wireless handset.

5. The system of claim 1 wherein the high speed serial bus comprises a universal serial bus.

6. The system of claim 1 wherein the portable device includes means for actuating the interface.

7. The system of claim 1 wherein the fixed radio part further includes means for receiving control commands via a public switch telephone network.

8. The system of claim 1 wherein the control commands comprise DTMF signals.

9. The system of claim 1 wherein the control commands comprise digitally encoded data.

10. The system of claim 1 wherein the fixed radio part further provides access to the Internet via an associated PSTN line.

11. The system of claim 1 wherein the control commands comprise voice signals.

12. The system of claim 11 wherein the interface includes speech recognition functionalities for recognizing the voice signal control commands.

13. A system enabling a user wireless access to a variety of telephony software functionalities residing within a personal computer, comprising:
   a portable wireless device enabling selective use of the telephony software functionalities of the personal computer by the portable wireless device in response to voice commands received by the portable wireless device, the voice commands being transmitted from the portable device as a wireless signal;
   a bus for transmitting voice commands to the personal computer, said bus capable of transmitting isochronous signals;
   a sensor controller interfaced with the bus, said controller controlling a remote sensor associated with an electronic device;
   a fixed radio part for receiving the wireless signal voice command from the portable wireless device and processing the wireless signal for transmission over the bus, the fixed radio part also configured to receive voice commands from a public switched telephone network line for transmission over the bus; and
   an interface associated with the personal computer and including voice recognition means responsive to the voice commands for providing the portable device use of the variety of telephony software functionalities, the interface selectively actuable from the portable device.

14. The system of claim 13 wherein the portable device comprises a second computer.

15. The system of claim 13 wherein the portable device includes means for selectively actuating the interface.

16. The system of claim 13 wherein the interface further provides access to the variety of software functionalities in response to DTMF commands.

17. A system enabling wireless access to a plurality of telephony software functionalities, comprising:
   a user interface responsive to control commands for providing access to a plurality of telephone software functionalities on a personal computer;
   a wireless device for generating control commands for providing access to the plurality of telephony software functionalities, the control commands being transmitted as a wireless signal;
   means associated with the wireless device for selectively actuating the user interface;
   means for interfacing the wireless signals with the user interface, the means for interfacing including a sensor controller for controlling a remote sensor associated with an electronic device;
   a bus for transmitting the control commands to the personal computer; and
   a radio-fixed part for transmitting/receiving the wireless signal control command from the wireless device and processing the wireless signal for transmission over the bus to the personal computer.

18. The system of claim 17 wherein the control commands comprise digitally encoded data.

19. The system of claim 17 wherein the control commands are transmitted as a wireless signal via a DECT air interface.

20. The system of claim 17 wherein the means for interfacing further includes means for receiving control commands from a public-switched telephone network.

21. The system of claim 17 wherein the control commands comprise DTMF signals.

22. The system of claim 21 wherein the control commands comprise voice signals.

23. The system of claim 22 wherein the interface includes speech recognition functionalities for recognizing the voice signal control commands.

* * * * *